(12) United States Patent
Masini et al.

(10) Patent No.: US 10,960,579 B2
(45) Date of Patent: Mar. 30, 2021

(54) MOLD MADE OF A COMPOSITE MATERIAL AND PROCESS EMPLOYING THIS MOLD

(71) Applicant: Automobili Lamborghini S.p.A., Sant'Agata Bolognese (IT)

(72) Inventors: Attilio Masini, Monteveglio (IT); Nicolò Pasini, Taino (IT); Luigi De Sario, Crevalcore (IT); Casper Steenbergen, Sant'Agata Bolognese (IT)

(73) Assignee: AUTOMOBILI LAMBORGHINI S.P.A., Sant'agata Bolognese Bo (IT)

( * ) Notice: Subject to any disclaimer, the term of this patent is extended or adjusted under 35 U.S.C. 154(b) by 536 days.

(21) Appl. No.: 14/692,418

(22) Filed: Apr. 21, 2015

(65) Prior Publication Data

US 2015/0224678 A1 Aug. 13, 2015

Related U.S. Application Data

(60) Division of application No. 13/693,387, filed on Dec. 4, 2012, now Pat. No. 9,649,784, which is a
(Continued)

(30) Foreign Application Priority Data

Jun. 14, 2010 (IT) .............................. MI2010A1072

(51) Int. Cl.
*B29C 33/20* (2006.01)
*B29C 33/30* (2006.01)
(Continued)

(52) U.S. Cl.
CPC ............ *B29C 33/20* (2013.01); *B29C 33/301* (2013.01); *B29C 33/3807* (2013.01);
(Continued)

(58) Field of Classification Search
CPC ... B29C 33/0088; B29C 33/22; B29C 33/301; B29C 33/307; B29C 33/0038;
(Continued)

(56) References Cited

U.S. PATENT DOCUMENTS 2,178,774 A * 11/1939 Bogoslowsky ....... B29C 33/126
264/278
2,392,804 A * 1/1946 Basolo .................... B23B 47/28
219/98
(Continued)

FOREIGN PATENT DOCUMENTS

CN 1190927 A 8/1998
CN 1104974 C 4/2003
(Continued)

OTHER PUBLICATIONS

Miracle & S. L. Donaldson D B Ed, "Composites, Vacuum Infusion", Dec. 1, 2001, ASM Handbook, pp. 501-511, XP002619563.
(Continued)

*Primary Examiner* — Matthew J Daniels
*Assistant Examiner* — Andrew D Graham
(74) *Attorney, Agent, or Firm* — Lucas & Mercanti, LLP (57) ABSTRACT

A mold for manufacturing products made of composite materials, which comprises at least one functional portion made of a composite material joined to at least one interface made of a composite material which projects at least partially around the functional portion, said mold being provided with one or more mechanic fastening devices for the coupling with at least another mold.

10 Claims, 10 Drawing Sheets

Related U.S. Application Data continuation-in-part of application No. PCT/IB2011/052567, filed on Jun. 14, 2011.

(51) Int. Cl.

| | | |
|---|---|---|
| *B29C 33/38* | (2006.01) | |
| *B29C 70/48* | (2006.01) | |
| *B29C 70/72* | (2006.01) | |
| *B29C 70/54* | (2006.01) | |
| *B29C 70/86* | (2006.01) | |
| *B29C 45/02* | (2006.01) | |
| B29K 307/04 | (2006.01) | |
| F16L 55/02 | (2006.01) | |
| F16L 57/06 | (2006.01) | |
| B29L 31/00 | (2006.01) | |

(52) U.S. Cl.
CPC ............. *B29C 45/02* (2013.01); *B29C 70/48* (2013.01); *B29C 70/548* (2013.01); *B29C 70/72* (2013.01); *B29C 70/86* (2013.01); *B29K 2307/04* (2013.01); *B29K 2913/00* (2013.01); *B29L 2031/00* (2013.01); *F16L 55/02* (2013.01); *F16L 57/06* (2013.01)

(58) Field of Classification Search
CPC ..... B29C 45/02; B29C 45/1735; B29C 45/20; B29C 45/2608; B29C 45/2708; B29C 45/27; B29C 2045/2719; B29C 2045/022; B29C 2045/588; B29C 45/586; B29C 2045/1718; B29C 2045/2889; B29C 45/036; B29C 45/0408; B29C 70/48; B29C 70/30; B29C 70/345; B29C 47/0808; B29C 45/04; B29C 45/64; B29C 2045/665; B29C 45/4005; B29C 2045/4094; B29C 45/401
USPC .................. 425/564, 567, 569, 589, 595
See application file for complete search history.

(56) References Cited

U.S. PATENT DOCUMENTS

| | | | | |
|---|---|---|---|---|
| 2,754,546 A * | 7/1956 | Mason | ............... | B29C 35/12 425/41 |
| 2,800,693 A * | 7/1957 | Kusnery | ............... | B22D 17/24 425/444 |
| 2,834,052 A * | 5/1958 | Hunn | ............... | B22C 7/00 205/70 |
| 2,915,789 A * | 12/1959 | Dykstra | ............... | B23B 47/28 24/569 |
| 2,961,713 A * | 11/1960 | Hartley | ............... | B29C 33/0022 264/160 |
| 3,056,167 A * | 10/1962 | Knoppel | ............... | B29C 33/00 156/500 |
| 3,135,640 A * | 6/1964 | Kepka | ............... | B28B 7/32 156/147 |
| 3,566,447 A * | 3/1971 | Ogden | ............... | B29C 33/0038 264/219 |
| 3,620,119 A * | 11/1971 | King, Jr. et al. | ........ | B21C 23/22 411/399 |
| 3,636,241 A * | 1/1972 | Baumgartner | ......... | H02G 15/10 174/77 R |
| 3,695,572 A * | 10/1972 | Jullien-Davin | ......... | B29C 45/40 249/68 |
| 3,835,906 A * | 9/1974 | Dietlein | ............... | F16B 39/284 29/447 |
| 3,904,243 A * | 9/1975 | Kostelec | ............... | A47C 5/12 264/DIG. 53 |
| 4,120,632 A * | 10/1978 | Stoeberl | ............... | B29C 33/0038 264/46.6 |
| 4,267,142 A * | 5/1981 | Lankheet | ............... | B29C 70/44 264/102 |
| 4,696,711 A * | 9/1987 | Greszczuk | ............ | B29C 70/545 156/173 |
| 4,795,125 A * | 1/1989 | Boros | ............... | B29C 33/04 249/78 |
| 4,812,193 A * | 3/1989 | Gauron | ............... | B29C 65/42 156/293 |
| 5,114,637 A * | 5/1992 | Williams | ............... | B29C 39/32 264/101 |
| 5,206,076 A * | 4/1993 | Gatarz | ............... | B29C 33/0044 4/584 |
| 5,277,854 A * | 1/1994 | Hunt | ............... | B27N 3/08 162/223 |
| 5,730,926 A * | 3/1998 | Matsumoto | ......... | B29C 45/1734 264/500 |
| 5,744,173 A * | 4/1998 | Sterett | ............... | B22C 9/00 249/79 |
| 6,091,063 A * | 7/2000 | Woods | ............... | B23K 20/023 219/633 |
| 6,186,707 B1 * | 2/2001 | Kain | ............... | B23B 49/026 156/253 |
| 6,319,447 B1 * | 11/2001 | Cundiff | ............... | B29C 70/48 264/257 |
| 6,346,209 B1 * | 2/2002 | Messemer | ............ | B29C 45/4005 264/334 |
| 6,638,466 B1 | 10/2003 | Abbott | | |
| 6,759,002 B1 * | 7/2004 | Engwall | ............... | B23Q 3/086 156/245 |
| 8,092,210 B2 * | 1/2012 | Lopez Sanchez | ....... | B27N 3/08 249/161 |
| 2002/0181224 A1 | 12/2002 | Tahara et al. | | |
| 2002/0185759 A1 * | 12/2002 | Gorczyca | ............ | B29C 45/2632 264/1.33 |
| 2003/0012844 A1 * | 1/2003 | Starkey | ............... | B29C 45/401 425/556 |
| 2003/0091781 A1 * | 5/2003 | Arakawa | ............... | B29C 43/021 428/64.4 |
| 2003/0227107 A1 * | 12/2003 | Stewart | ............... | B29C 43/183 264/236 |
| 2004/0017020 A1 * | 1/2004 | Loving | ............... | B29C 70/443 264/134 |
| 2004/0096535 A1 * | 5/2004 | Hudecek | ............... | B29C 33/306 425/193 |
| 2007/0063378 A1 * | 3/2007 | O'Donoghue | .......... | B29C 33/40 264/219 |
| 2007/0164481 A1 * | 7/2007 | Polk | ............... | B29C 31/047 264/320 |
| 2007/0182071 A1 * | 8/2007 | Sekido | ............... | B29C 33/0066 264/511 |
| 2007/0278718 A1 * | 12/2007 | Okoli | ............... | B29C 70/443 264/299 |
| 2007/0286955 A1 * | 12/2007 | Kondo | ............... | B29C 70/545 427/249.2 |
| 2008/0008521 A1 * | 1/2008 | Naik | ............... | F16B 5/01 403/255 |
| 2009/0051067 A1 * | 2/2009 | Hayashi | ............... | B29C 70/48 264/101 |
| 2009/0134549 A1 * | 5/2009 | Yamamoto | .......... | B29C 45/0025 264/261 |
| 2009/0162471 A1 * | 6/2009 | Ijiri | ............... | B29C 45/2608 425/405.1 |
| 2009/0202826 A1 * | 8/2009 | Sekido | ............... | B29C 70/345 428/365 |
| 2009/0218734 A1 * | 9/2009 | Eberth | ............... | B29C 45/14786 264/571 |

(56) References Cited

U.S. PATENT DOCUMENTS

| | | | | |
|---|---|---|---|---|
| 2009/0220320 A1* | 9/2009 | Zhang | ............... | F16B 5/01 411/177 |
| 2009/0230281 A1* | 9/2009 | Chen | ............... | B29C 45/401 249/68 |
| 2012/0258284 A1* | 10/2012 | Rendon | ............ | B29C 45/0001 428/156 |

FOREIGN PATENT DOCUMENTS

| | | | | |
|---|---|---|---|---|
| EP | 0412891 | A2 | | 2/1991 |
| EP | 0662380 | A2 | | 7/1995 |
| FR | 2664529 | A1 | | 1/1992 |
| FR | 2675732 | A1 | | 10/1992 |
| FR | 2771960 | A1 | | 6/1999 |
| FR | 2864801 | A1 | | 7/2005 |
| FR | 2864801 | A1 | * 7/2005 ............ B29C 33/40 |
| GB | 2134845 | A | | 8/1984 |
| GB | 2232630 | A | | 12/1990 |
| GB | 2243107 | A | | 10/1991 |
| JP | 03140213 | A | | 6/1991 |
| JP | 07195376 | A | | 8/1995 |
| JP | 08323870 | A | | 12/1996 |
| JP | 2003014938 | A | | 1/2003 |
| WO | 9850180 | A1 | | 11/1998 |
| WO | 03041947 | A1 | | 5/2003 |
| WO | 2012001660 | A2 | | 1/2012 |

OTHER PUBLICATIONS

International Search Report for EP12199103, dated Oct. 28, 2013.
Office Action for Chinese Patent Application No. 201180028871.9, dated May 6, 2014.
Office Action for Chinese Patent Application No. 201180028871.9, dated Sep. 24, 2014.
International Search Report for EP14171906.2, dated Jul. 23, 2014.
Office Action for Japanese Patent Application No. 2013514818, dated Oct. 7, 2014.
Office Action for Russian Patent Application No. 2013101582, dated Dec. 17, 2014.
Office Action for European Application No. 12 199 103.8-1706, dated Feb. 9, 2017.
Office Action for European Application No. 14 171 906.2-1706, dated Mar. 8, 2017.
Office Action for Chinese Application No. 201410740968.8, dated Jun. 28, 2016.
Office Action for Chinese Application No. 201410740968.8, dated Feb. 13, 2017.
Office Action for Chinese Application No. 201410740968.8, dated Jul. 13, 2017.
Campbell et al., "Manufacturing processes for advanced composites, passage", Manufacturing Processes for Advanced Composites, 2004, XP002565382, pp. 331-341.

* cited by examiner

MOLD MADE OF A COMPOSITE MATERIAL AND PROCESS EMPLOYING THIS MOLD

CROSS-REFERENCE TO RELATED APPLICATIONS

This application is a divisional of U.S. application Ser. No. 13/693,387 filed on Dec. 4, 2012, which is a continuation of PCT International Application Serial No. PCT/IB2011/052567, filed Jun. 14, 2011, which claims the benefit of priority from Italian Patent Application Serial No. MI2010A001072, filed Jun. 14, 2010, the contents of each of which are incorporated herein by reference.

FIELD OF THE INVENTION

The present invention relates to a mold made of a composite material, as well as to a process which can employ this mold.

BACKGROUND OF THE INVENTION

The known RTM (Resin Transfer Molding) process employs molds made of steel for withstanding the high pressures, even higher than 15 bar, needed for the injection of the resin.

The shaping of the fiber layers and their subsequent deposition into the molds can be automated, thus making more repeatable and economic the parts produced with this process, however the molds of the RTM process are heavy, expensive and bulky. Moreover, the metal molds need a complex design which must take their thermal expansion into account during the curing cycle of the resin, to avoid the molded product being clogged inside a mold.

The RTM-Light process, in which a semirigid mold is arranged on a rigid mold, is known for overcoming these technical problems. The resin is injected at a pressure lower than 1 bar and air (0.5 bar) is sucked from a central low point for favoring the flowing of the resin. The joining between the two molds is obtained by creating vacuum (0.1 bar) along the edges of the two molds. This process, though it is simple to be carried out with light and economic devices, does not allow to manufacture products with the same speed and the same quality of the RTM process, since the injection pressure is relatively low and the side of the product facing the semirigid mold has a rough finish. Furthermore, the low pressure employed in the RTM-Light process does not ensure the correct and complete impregnation of the dry fibers, thus causing the manufacture of low quality components.

EP 1721719 and FR 2864801 disclose RTM processes in which the molds are made of composite materials. In particular, the molds disclosed in FR 2864801 are in turn made by means of a RTM process in which the resin is injected only after the fibers have been arranged between a mold made of a composite material and a master or a template. These known molds are relatively expensive due to the RTM process employed for their manufacturing and to the need of arranging a template between a first mold which is already ready and a second mold during the manufacturing of the latter. The known molds made of a composite material further require complex supporting structures and/or must be relatively thick, thus expensive, for withstanding the pressures of the RTM process.

SUMMARY OF THE INVENTION

It is therefore an object of the present invention to provide a process which is free from all the above disadvantages, namely a process which is fast, economic and easy to be automated, and which allows to obtain high quality products with light and compact devices. Said object is achieved with a mold and a process, whose main features are disclosed herein.

The process according to the present invention provides for molds obtained by layers of carbon fibers pre-impregnated with a resin (known also as pre-preg) and for the cure of the final products with the heating of these molds in an oven or an autoclave, instead of employing a press with heated molds. Therefore, the resin can be injected at lower pressures compared to the RTM process but anyway sufficient for ensuring the correct and complete impregnation of the dry fibers which made up the substrate of the final product.

Said pressures are preferably higher compared to the RTM-Light process, especially if the molds are stiffened by means of ribs or other reinforcing members.

The joining between the molds is obtained by means of particular mechanic fastening means and gaskets, which allow to keep the molds hermetically closed at the injection pressures of the resin.

The molds preferably incorporate particular bushings which allow both a precise and resistant mechanic fastening between the molds and the easy and fast addition of particular devices, such as injectors, suction mouths and/or extractors.

At least one mold comprises particular canals and/or slits for uniformly distributing the resin before it reaches the cavities, so as to obtain products free from defects such as hollow spaces, pores, delaminations or dry zones. Particular wells arranged in correspondence with the injectors avoid the wear of the molds due to the injection pressure of the resin.

The production of the molds is preferably obtained in a fast and accurate manner by means of particular masters provided with tridimensional templates of the final product and with mechanic arrangements, such as reference surfaces for obtaining particular interfaces in the molds, side walls for obtaining corresponding walls suitable for strengthening the molds, pins for arranging the bushings with precision in the molds, removable elastomeric sections and/or bulges for obtaining canals or wells in the molds. Several identical molds can be produced with a single master, so as to increase in a relatively simple and economic manner the productivity of the process according to the present invention.

Furthermore, the molds according to the present invention are light and not much bulky, so that they can be easily handled before, during and after use, for example when they are prepared, filled and arranged in the oven or in the autoclave.

Since the molds are made of substantially the same material of the products, they undergo substantially the same thermal expansions, so as to compensate negative effects, if any, due to these expansions.

All the above advantages are remarkably increased if in the process a molding unit is employed, in which all the molds, namely at least two complementary molds, are manufactured according to the present invention.

BRIEF DESCRIPTION OF THE DRAWINGS

Further advantages and features of the process and the devices according to the present invention will become clear to those skilled in the art from the following detailed and non-limiting description of two embodiments thereof with reference to the attached drawings, wherein.

DETAILED DESCRIPTION OF THE INVENTION

Figure 1:
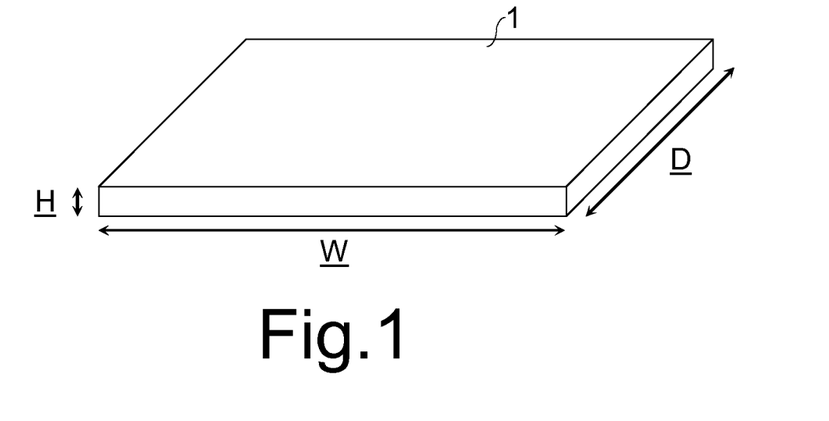
FIG. 1 shows a perspective view of a product which can be manufactured with the mold according to the present invention.

Referring to FIG. 1, it is seen that a product 1 made of a composite material has in a known way a tridimensional shape, for example parallelepiped, with a height H, a width W and a depth D. In practice, product 1 generally has more complex shapes, also curved and/or irregular, according to the required function, such as for example frames, bodyworks, covers, accessories and other structural, fluid dynamic and/or aesthetic parts of land, sea and air vehicles.

Figure 2:
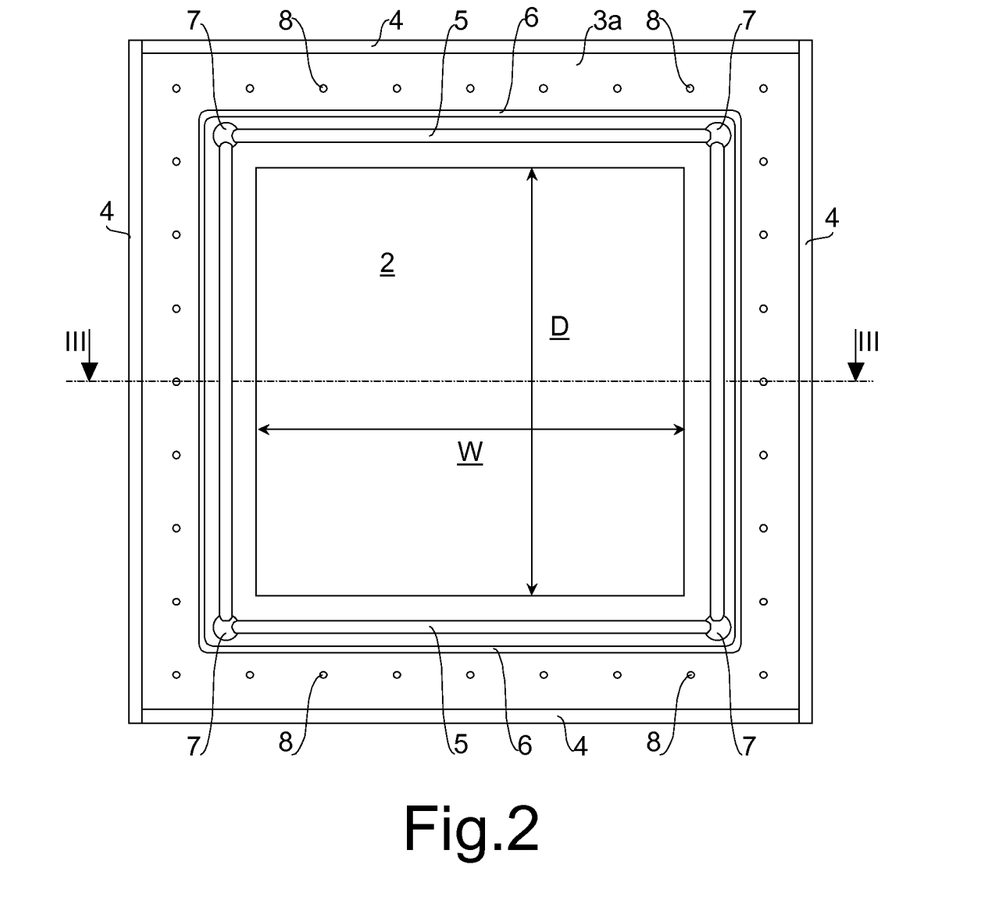
FIG. 2 shows a bottom view of the first master according to the first embodiment.
Figure 3:
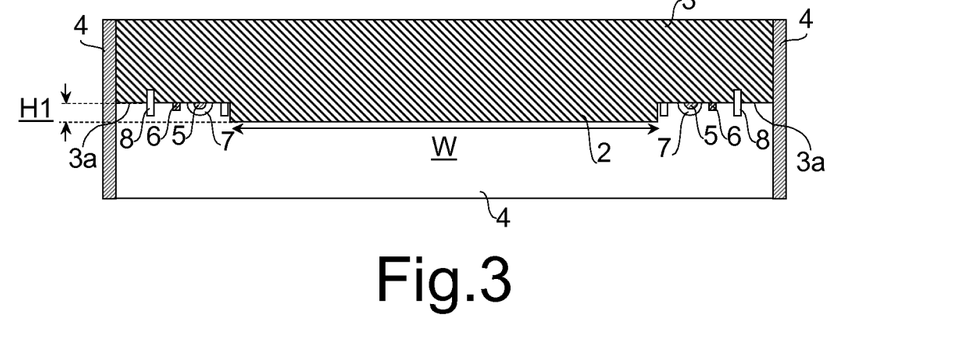
FIG. 3 shows section III-III of FIG. 2.

Referring to FIGS. 2 and 3, it is seen that a first operating step of the process comprises the manufacturing, for example with a CAD/CAM system, of a first template 2 which has substantially the same tridimensional shape and the same sizes of at least one first portion of product 1. In the present embodiment, first template 2 has substantially the same width W and the same depth D, but a height H1 lower than height H of product 1. First template 2 is joined or integral with at least one first reference surface 3a of a first master 3, in particular substantially parallelepiped-shaped. First reference surface 3a is substantially planar, wider and deeper than first template 2, so as to project around it. One or more first walls 4, for example of aluminum, wood or epoxy resin, substantially perpendicular to first reference surface 3a are fastened around first master 3, so as to surround first reference surface 3a. One or more first ridges 5 are arranged on first reference surface 3a of first master 3 around first template 2, while at least a second ridge 6 is arranged on first reference surface 3a around first ridges 5. First ridges 5 are connected to one or more bulges 7, in particular having a hemispherical shape. The cross-section of first ridges 5 is convex, in particular substantially semi-circular or semielliptical, while the cross-section of second ridge 6 is substantially rectangular, in particular square. A plurality of first pins 8 perpendicularly project in turn from first reference surface 3a of first master 3 around second ridge 6. First template 2, first ridges 5, second ridge 6 and/or bulges 7 can be made of a single piece of epoxy resin on first reference surface 3a of first master 3 with digital control cutters or can comprise separate members mutually joined and/or applied onto first reference surface 3a. In particular, first ridges 5 and/or second ridge 6 are preferably made up by elastomeric sections glued in a removable manner onto first reference surface 3a. First template 2 can be an epoxy resin block shaped by a digital control cutter and then glued onto first reference surface 3a.

Figure 4:
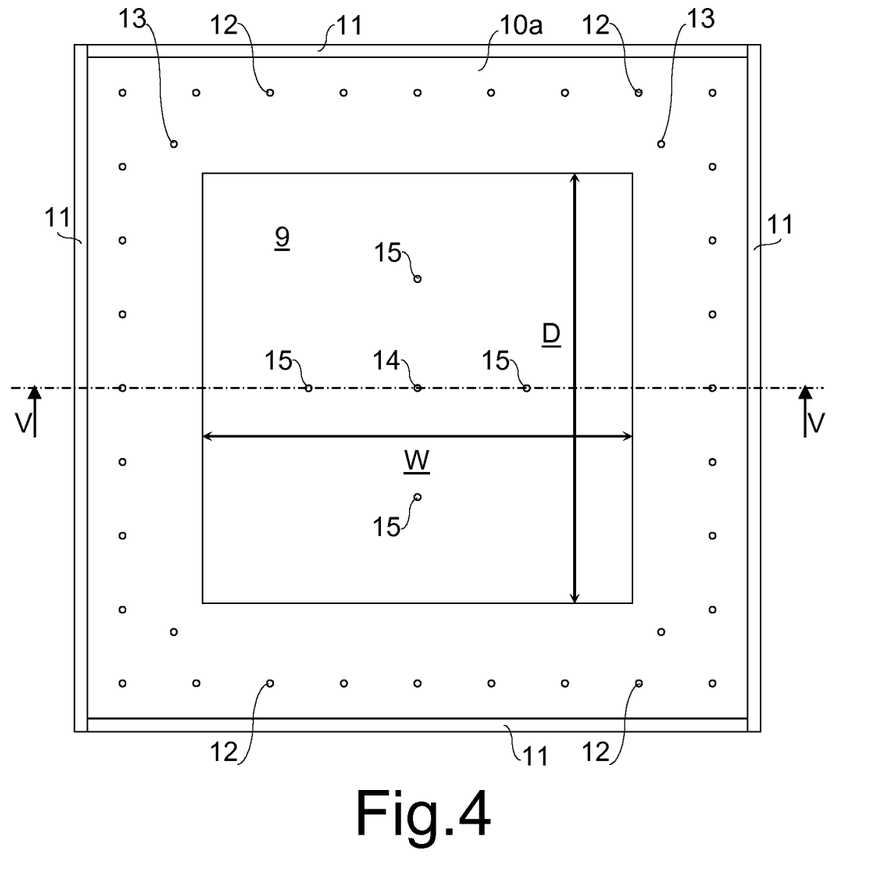
FIG. 4 shows a top view of the second master according to the first embodiment.
Figure 5:
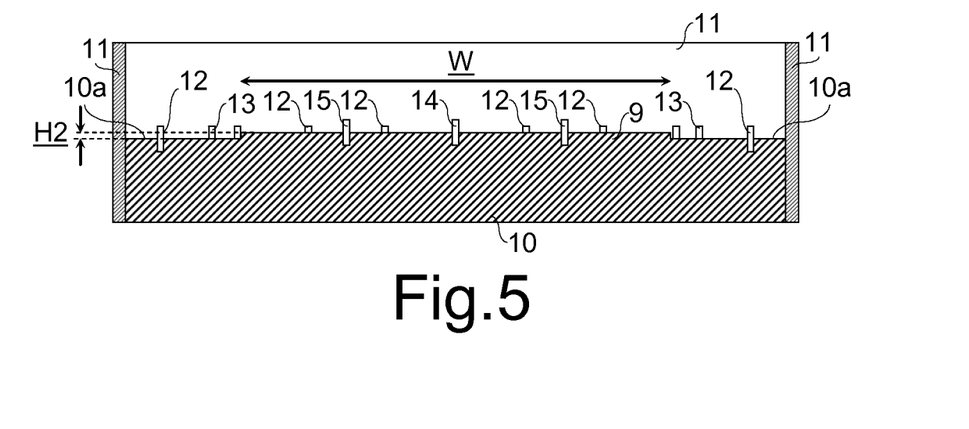
FIG. 5 shows section V-V of FIG. 4.

Referring to FIGS. 4 and 5, it is seen that a second operating step of the process comprises the manufacturing, for example with a CAD/CAM system, of a second template 9 which has substantially the same tridimensional shape and the same sizes of at least one second portion of product 1. In the present embodiment, second template 9 has substantially the same width W and the same depth D, but a height H2 lower than height H of product 1, so that the sum of height H1 of first template 2 with height H2 of second template 9 substantially corresponds to height H of product 1. Second template 9 is joined or integral with at least one second reference surface 10a of a second master 10, in particular substantially parallelepiped-shaped. Second reference surface 10a is substantially planar, wider and deeper than second template 9, so as to project around it. One or more second walls 11, for example of aluminum, wood or epoxy resin, substantially perpendicular to second reference surface 10a are fastened around second master 10, so as to surround second reference surface 10a. A plurality of second pins 12 project from second reference surface 10a of second master 10 around second template 9. The position of first pins 8 on first master 3 is substantially equal to the position of second pins 12 on second master 10. One or more third pins 13 project from second reference surface 10a of second master 10 at substantially the same positions of bulges 7 on first reference surface 3a of first master 3. At least one fourth pin 14 and one or more fifth pins 15 project from second template 9 of second master 10.

Figure 6:
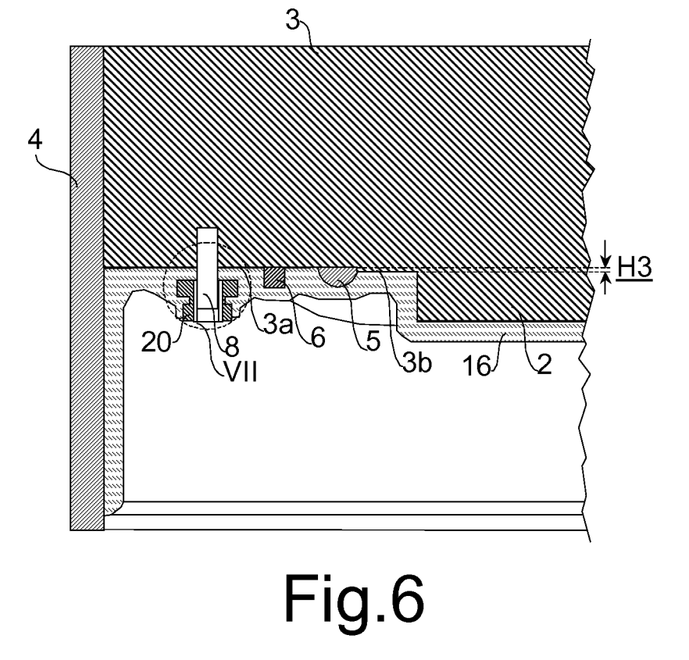
FIG. 6 shows FIG. 3 partially enlarged with the first mold according to the first embodiment.
Figure 7:
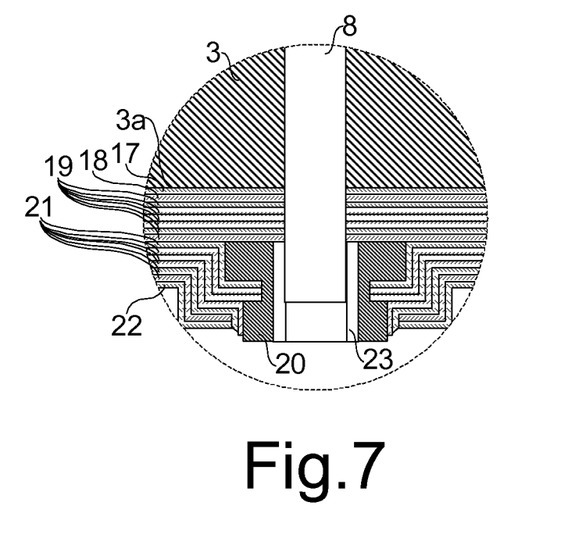
FIG. 7 shows detail VII of FIG. 6.

Referring to FIGS. 6 and 7, it is seen that a third operating step of the process comprises a spraying of first master 3 with a sealing liquid which closes the present porosities for obtaining a smooth and regular surface, as well as the cleaning of these surfaces with a detaching substance, after which a first mold 16 is made by applying onto first template 2, onto first reference surface 3a and onto first walls 4 of first master 3 a plurality of fiber layers, in particular carbon fibers, pre-impregnated with a resin, known also with the name of pre-preg. In the figures, for simplicity's sake, first template 2 and first reference surface 3a are shown turned downward, but it is preferable that during this operating step they are turned upward for facilitating the arrangement of these layers. In particular, first mold 16 comprises a first inner layer 17 and/or a second inner layer 18. Preferably, first inner layer 17 comprises pre-preg with fibers of the type 1K (1000 threads per fiber), PW (Plain Weave), 100 g/m$^2$ basis weight and 0.1 mm thickness, while second inner layer 18 comprises fibers of the type 3K (3000 threads per fiber), TW (Twill Weave) 2×2, 200 g/m$^2$ basis weight and 0.25 mm thickness. The fibers of inner layers 17 and/or 18 are substantially parallel or perpendicular to each other. Strips of pre-preg (not shown in the figures) can be arranged between inner layer 17 or 18 and the corners of first template 2 and/or the corners comprised between first reference surface 3a and first template 2, first walls 4 and/or second ridge 6, so as to make these corners sharper.

First master 3 comprises at least one protruding portion 3b between first ridges 5 and first template 2 which projects from first reference surface 3a with a height difference H3 comprised between 0.1 mm and 1 mm.

One or more first intermediate layers 19, in particular from four to six intermediate layers, are then applied onto inner layers 17 and/or 18, after which first bushings 20 are inserted onto first pins 8 and one or more second intermediate layers 21, in particular from four to six intermediate layers, are applied onto first intermediate layers 19 and first bushings 20, so as to incorporate the latter in first mold 16. Intermediate layers 19 and/or 21 comprise pre-preg with fibers of the type 12K (12000 threads per fiber), TW (Twill Weave) 2×2, 700 g/m² basis weight and 0.4 mm thickness. The fibers of intermediate layers 19 and/or 21 are substantially parallel, diagonal (±45°) or perpendicular to each other. At least one outer layer 22 is applied onto second intermediate layers 21 and comprises pre-preg with fibers of the type 3K (3000 threads per fiber), TW (Twill Weave) 2×2, 200 g/m² basis weight and 0.25 mm thickness. The basis weight and/or the thickness of intermediate layers 19, 21 are thus greater than the basis weight and/or the thickness of inner layers 17, 18 and/or of outer layer 22. First bushings 20 are provided with an inner thread 23.

During the application, in particular after two, three or four layers are applied one on the other, inner layers 17, 18, intermediate layers 19, 21 and/or outer layer 22 are compressed onto first master 3 by means of compacting steps in which the most external layer is covered by an anti-adhesive sheet and by a layer of a ventilating material, after which first master 3 is inserted into a vacuum bag which presses the layers already arranged on first master 3 by effect of the outer pressure acting onto the vacuum bag. These compacting steps may comprise the insertion of first master 3 with the vacuum bag into an autoclave at a pressure comprised between 1 and 10 bar for creating an additional pressure onto the vacuum bag.

Inner layers 17 and/or 18, intermediate layers 19, 21 and/or outer layer 22 cover also first ridges 5, second ridge 6 and bulges 7, while they are provided with holes for being crossed by first pins 8 of first master 3. First mold 16 comprises at least ten layers in total, namely at least one inner layer 18, eight intermediate layers 19, 21 and an outer layer 22. Before the application, each layer 17, 18, 19, 21 and/or 22 is shaped with a digital control device on the basis of data obtained according to the shape and the sizes of first master 3.

First mold 16 is then completed by a curing step under pressure, in which first master 3 provided with first bushings 20 and layers 17, 18, 19, 21 and 22 is inserted into a vacuum bag, always with an anti-adhesive sheet and with a layer of a ventilating material, in turn arranged into an autoclave, so that the layers are joined to each other with a pressure and with a temperature which are suitable for curing the resin which impregnates them.

Figure 8:
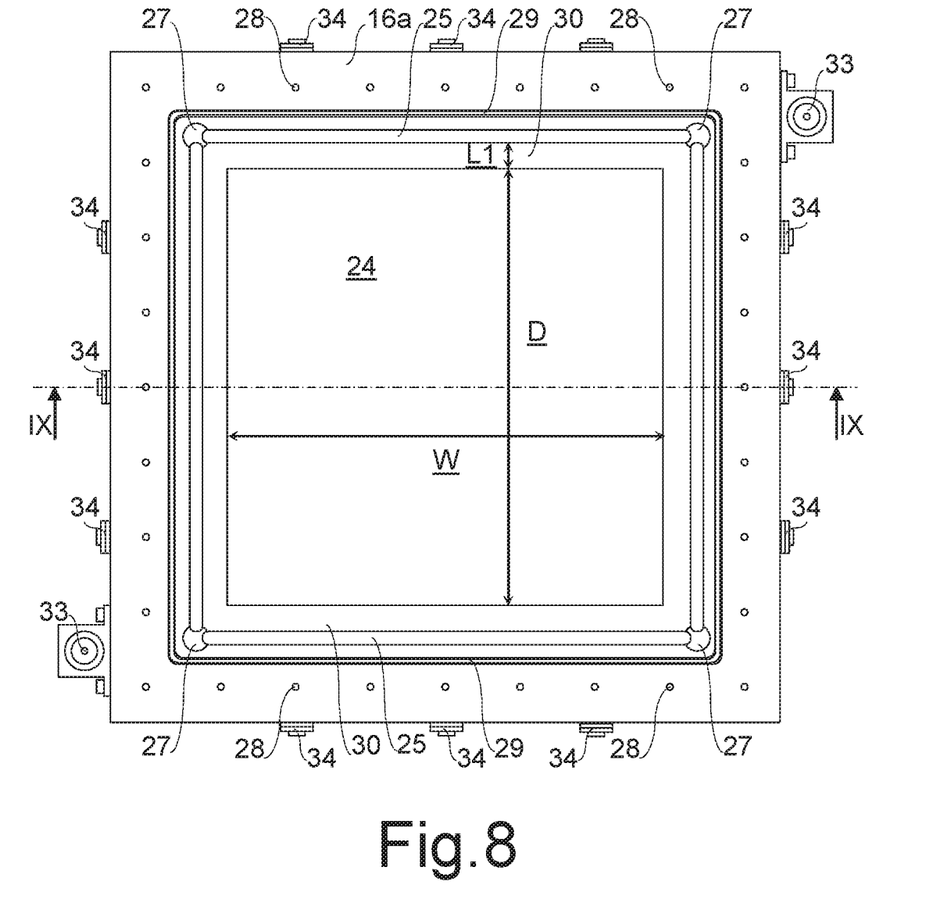
FIG. 8 shows a top view of the first mold of FIG. 6, removed from the first master.
Figure 9:
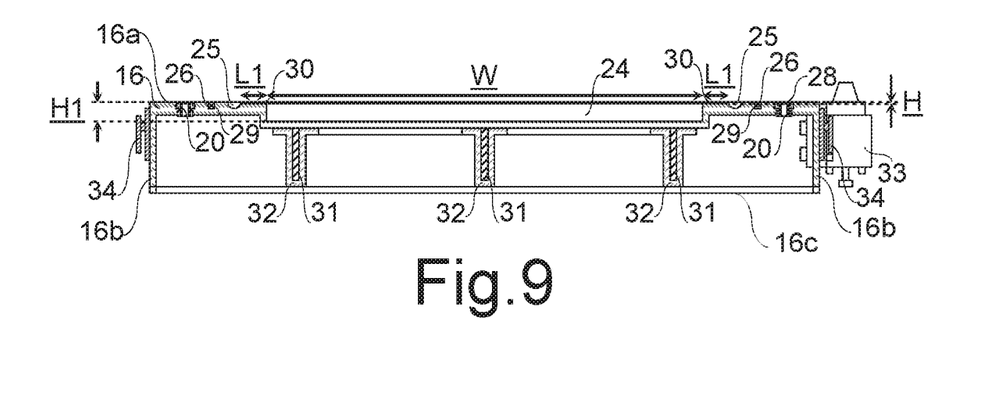
FIG. 9 shows section IX-IX of FIG. 8.

Referring to FIGS. 8 and 9, it is seen that first mold 16, once removed from the autoclave, cooled and separated from first master 3, comprises at least one first cavity 24 substantially complementary to first template 2 of first master 3, with substantially the same width W, the same depth D and the same height H1. First mold 16 comprises at least one first interface 16a made of a single piece with first cavity 24. First interface 16a projects entirely, or at least partially, around first cavity 24 and is substantially complementary to first reference surface 3a of first master 3. First mold 16 comprises also one or more first side walls 16b substantially corresponding to first walls 4 of first master 3 and substantially perpendicular to first interface 16a. As it can be seen from the figures, first side walls 16b project from first interface 16a so that first mold 16 is substantially vat-shaped. As it can be further seen from FIG. 9, backing plate 16c extends between first side walls 16b and is substantially parallel to first interface 16a. One or more first canals 25 substantially complementary to first ridges 5 of first master 3 are arranged on first interface 16a of first mold 16 around first cavity 24, while at least a second canal 26 substantially complementary to second ridge 6 of first master 3 is arranged on first interface 16a around first canals 25. First canals 25 are connected to one or more wells 27 substantially complementary to bulges 7 of first master 3. A plurality of first holes 28 is arranged on first interface 16a of first mold 16 in correspondence with first bushings 20, namely with first pins 8 of first master 3.

When first mold 16 is separated from first master 3, first canals 25 and/or second canal 26 may still include the sections employed for first ridges 5 and/or second ridge 6, since the sections can come off first master 3. In this case, the sections are extracted from first canals 25 and/or second canal 26 for being reused or substituted. At least one tubular gasket 29, resistant to temperatures comprised between −60° and 220° C. and having a rigidity up to 60 Shore, is arranged in second canal 26.

First interface 16a is provided with at least one slit 30 substantially complementary to protruding portion 3b of first master 3 between first canals 25 and first cavity 24. Thickness H3 of slit 30 is comprised between 0.1 and 1 mm, while length L1 of slit 30 is comprised between 5 and 300 mm.

One or more ribs 31, preferably made of a composite material, in particular with carbon fibers, are fastened to first mold 16 on the side opposite to first interface 16a, in particular by means of adhesive and/or further pre-preg layers 32 applied astride first ribs 31 and first mold 16, as well as pressed and cured with a vacuum bag in an autoclave. First ribs 31 form a network and are preferably joined to first side walls 16b of first mold 16. First centering devices 33 and/or first mechanic fastening devices 34, for example toggle fasteners, are fixed outside first side walls 16b of first mold 16.

Figure 10:
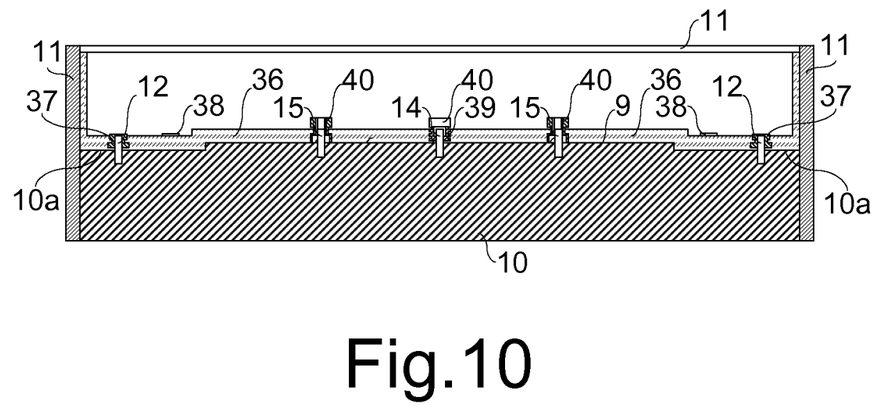
FIG. 10 shows FIG. 5 with the second mold according to the first embodiment.

Referring to FIG. 10, it is seen that a fourth operating step of the process comprises a spray sealing and a cleaning with a detaching agent of the second master 10, as well as the creation of a second mold 36 by applying onto second template 9, onto second reference surface 10a and onto second walls 11 of second master 10 a plurality of pre-preg layers, some of which are provided with holes for pins 12, 13 and 14. In particular, second mold 36 comprises a first inner layer and/or a second inner layer, a plurality of intermediate layers, in particular at least eight intermediate layers, as well as at least one outer layer of the same kind of the layers of first mold 16. Strips of pre-preg can be arranged between an inner layer and the corners of second template 9 and/or the corners comprised between second reference surface 10a and second template 9 and/or second walls 11, so as to make these corners sharper.

Second bushings 37, one or more third bushings 38 and at least one fourth bushing 39 are inserted onto second pins 12, onto third pins 13 and onto fourth pin 14, respectively, of second master 10, between two intermediate layers, in particular between a group of four first intermediate layers and a group of eight second intermediate layers. One or more fifth bushings 40 are instead arranged onto fifth pins 15 of second master 10 before applying the layers on the latter, so that fifth bushings 40 are flush with second template 9. Third bushings 38 and fourth bushing 39 are substantially the same. Third bushings 38, fourth bushing 39 and fifth bushings 40 are inwardly threaded. The distance between two adjacent first bushings 20 or second bushings 37 is comprised between 35 and 100 mm, preferably 70 mm.

The layers of second mold 36 are compressed onto second master 10 by means of compacting steps of the above mentioned kind for the first mold 16, with or without autoclave.

Second mold 36 is then completed with a curing step under pressure, in which second master 10 provided with the pre-preg layers and with bushings 37, 38, 39, 40 is inserted into a vacuum bag, always with an anti-adhesive sheet and with a layer of a ventilating material, in turn arranged into an autoclave, so that the layers are joined to each other with a pressure and with a temperature which are suitable for curing the resin which impregnates them.

Figure 11:
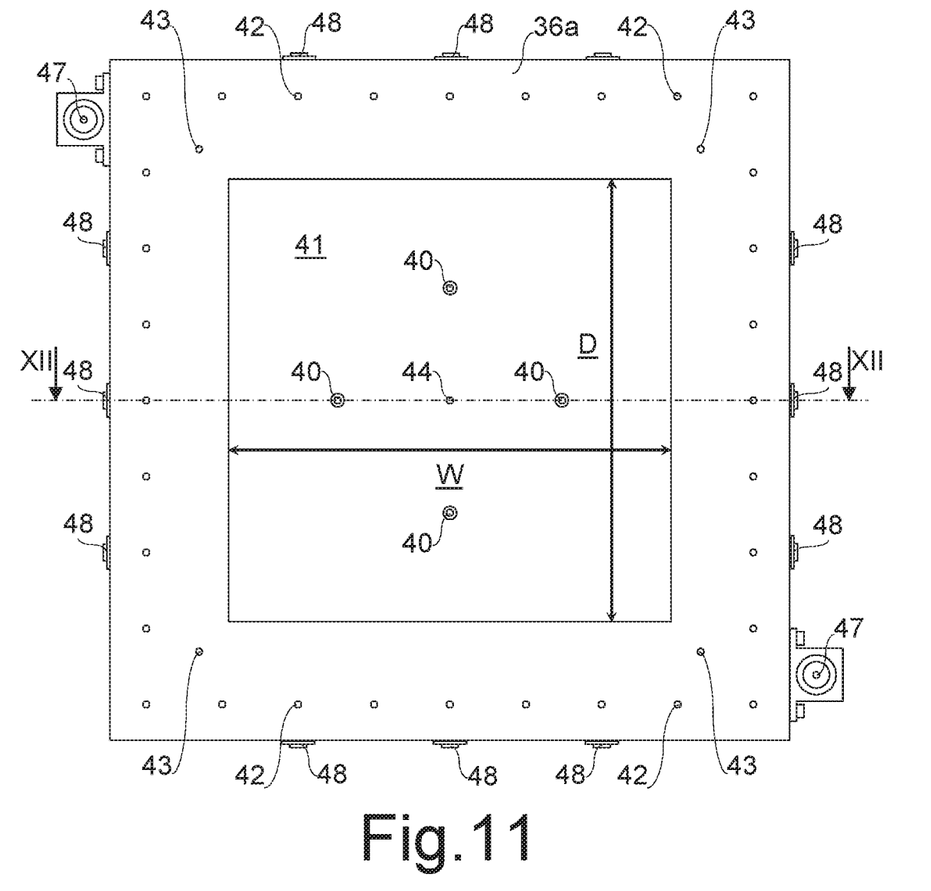
FIG. 11 shows a bottom view of the second mold of FIG. 10, removed from the second master.
Figure 12:
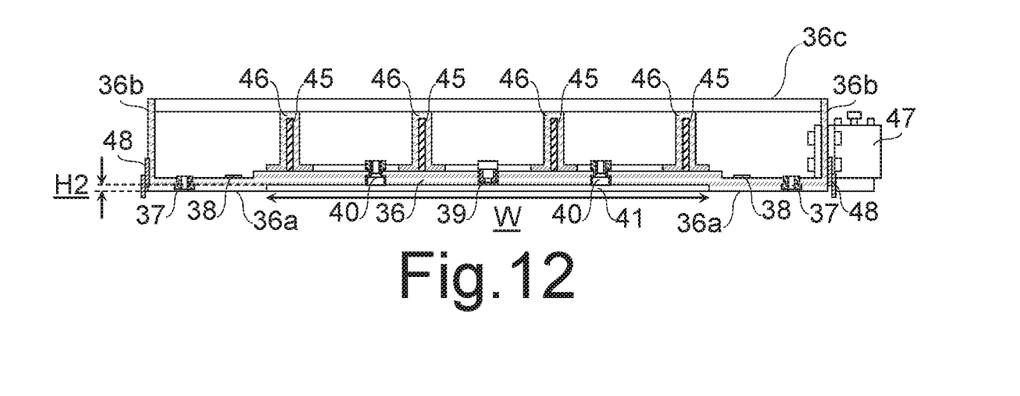
FIG. 12 shows section XII-XII of FIG. 11.

Referring to FIGS. 11 and 12, it is seen that second mold 36, once removed from the autoclave, cooled and separated from second master 10, comprises at least one second cavity 41 substantially complementary to second template 9 of second master 10, with substantially the same width W, the same depth D and the same height H2. Second mold 36 comprises at least one second interface 36a made of a single piece with second cavity 41. Second interface 36a projects entirely, or at least partially, around second cavity 41 and is substantially complementary to second reference surface 10a of second master 10. Second mold 36 comprises also one or more second side walls 36b substantially complementary to second side walls 11 of second master 10 and substantially perpendicular to second interface 36a. As it can be seen from the figures, second side walls 36b project from second interface 36a so that second mold 36 is substantially vat-shaped. As it can be further seen from FIG. 12, backing plate 36c extends between second side walls 36b and is substantially parallel to second interface 36a. Second holes 42 and third holes 43 are arranged on second interface 36a of second mold 36 in correspondence with second bushings 37 and third bushings 38, respectively, namely with second pins 12 and third pins 13 of second master 10. Fourth holes 44 and fifth bushings 40 lead instead to second cavity 41, with fifth bushings 40 flush with second cavity 41.

The distances between interfaces 16a, 36a, and bushings 20, 37 or 38, or between cavity 41 and fourth bushing 39, are greater than 0.2 mm.

One or more second ribs 45, preferably made of a composite material, in particular with carbon fibers, are fastened to second mold 36 on the side opposite to second interface 36a, in particular by means of adhesive and/or further layers 46 of pre-preg applied astride second ribs 45 and second mold 36, as well as pressed and cured with a vacuum bag in an autoclave. Second ribs 45 form a network and are preferably joined to second side walls 36b of second mold 36. Second centering devices 47 and/or second mechanic fastening device 48, for example toggle fasteners, are fixed outside second side walls 36b of second mold 36 at positions substantially corresponding to first centering devices 33 and to first mechanic fastening devices 34, respectively, of first mold 16.

Ribs 31, 45 are preferably applied to molds 16, 36 before removing the latter from the respective masters 3, 10.

Figure 13:
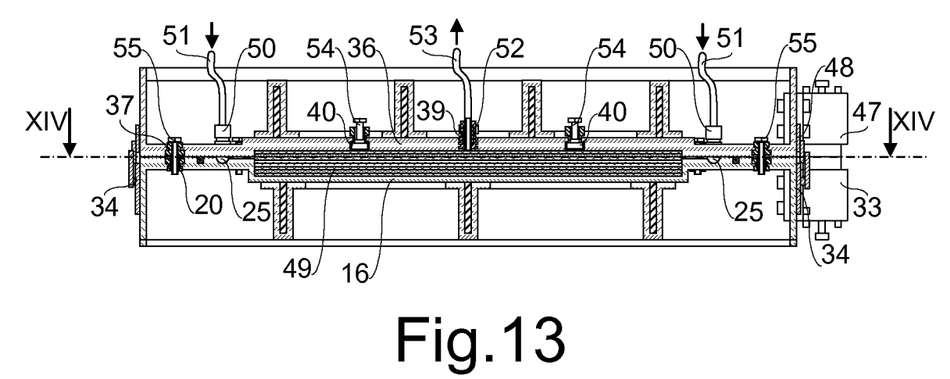
FIG. 13 shows a molding unit with the molds of FIGS. 10 and 12 during the use.
Figure 14:
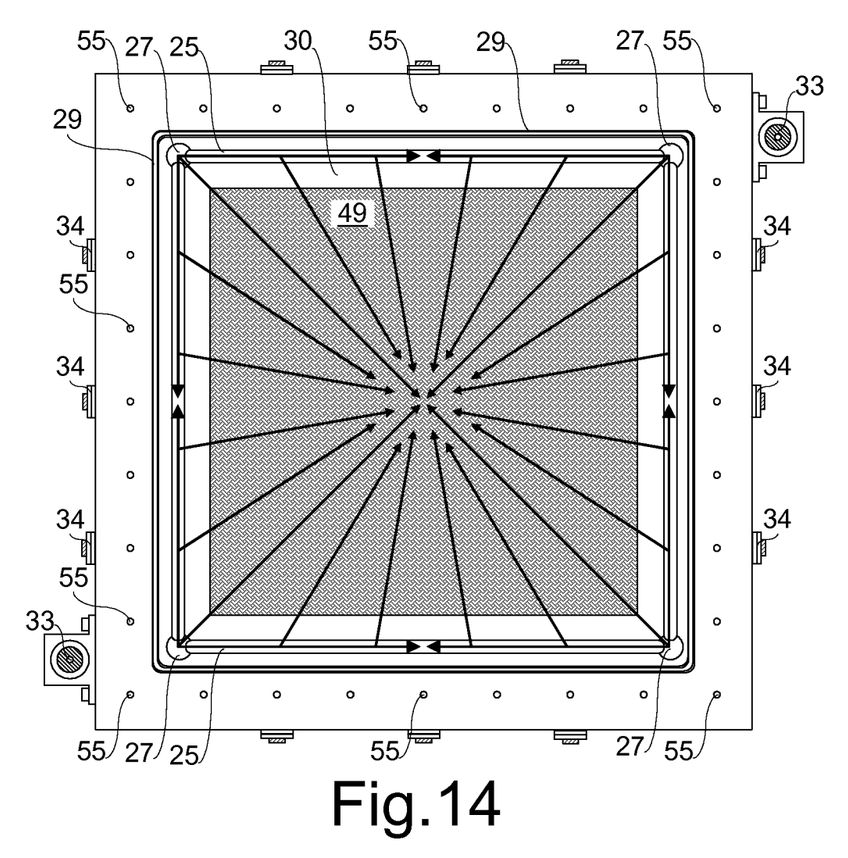
FIG. 14 shows section XIV-XIV of FIG. 13.

Referring to FIGS. 13 and 14, it is seen that a fifth operating step of the process comprises the preshaping and the arrangement of one or more substrates 49 into first cavity 24 of first mold 16 and/or into second cavity 41 of second mold 36. Third bushings 38 of second mold 36 are provided with injectors 50 connected to inlets 51. The distance between two adjacent injectors 50 is comprised between 400 and 1500 mm. Fourth bushing 39 of second mold 36 is provided with a suction mouth 52 connected to an outlet 53. Fifth bushings 40 of second mold 36 are provided with extractors 54. Substrates 49 comprise layers of fibers, in particular carbon fibers, which are dry, namely coupled with a quantity of resin from 0 to 10%, preferably 5%, by weight.

First mold 16 is then aligned with second mold 36 by means of centering devices 33, 47, after which first mold 16 is tightened to second mold 36 by means of screws 55 inserted into second bushings 37 and screwed into first bushings 20, as well as by mutually coupling mechanic fastening devices 34, 48, so as to made up a molding unit comprising first mold 16 and second mold 36. Other embodiments can comprise bushings 20, 37 only, mechanic fastening devices 34, 38 only and/or other mechanic fastening devices. Molds 16, 36 are then urged one against the other, so that interfaces 16a and 36a contact each other, thereby pressing gasket 29, so as to hermetically close molds 16, 36.

In a sixth operating step of the process, molds 16, 36 are heated at a temperature comprised between 25° C. and 70° C., preferably 60° C., after which resin heated at a temperature comprised between 40° C. and 70° C., in particular 60° C., is injected at a pressure comprised between 0.5 bar and 3.5 bar, in particular comprised between 1.5 and 2.5 bar, into cavities 24, 41 between first mold 16 and second mold 36 through inlets 51, injectors 50, wells 27, first canals 25 and slit 30. The arrows of FIG. 14 show the path followed by the resin till it reaches and completely impregnates substrates 49. Simultaneously, air is sucked from suction mouth 52 and from outlet 53, until the resin does not reach suction mouth 52, after which the injection of resin is interrupted. When the resin is injected into cavities 24, 41, the inflow zones of the resin, namely slit 30, are at a lower level with respect to the evacuation zones, namely to suction mouth 52. During said evacuation, the pressure in cavities 24, 41 in the spaces not reached by the resin is lower than 0.5 bar, in particular comprised between 0.001 and 0.02 bar.

Once the resin injection is competed, molds 16, 36 are arranged into an oven or an autoclave and are slowly heated (from 2° to 4° C. per minute) from the injection temperature up to a cure temperature comprised between 90° and 100° C., which is kept for about one hour, after which it is increased to a post-cure temperature comprised between 120° and 160° C., which is kept for about two hours. At the end of the cure cycle, molds 16, 36 are cooled down to a temperature comprised between 40° and 70° C. and are opened, so that final product 1, comprising substrates 49 incorporated in the cured resin, can be extracted, in particular by means of extractors 54, for being trimmed and cleaned. The cure and post-cure cycle depends on the chemical features of the resin employed for impregnating the dry fabric.

Figure 15:
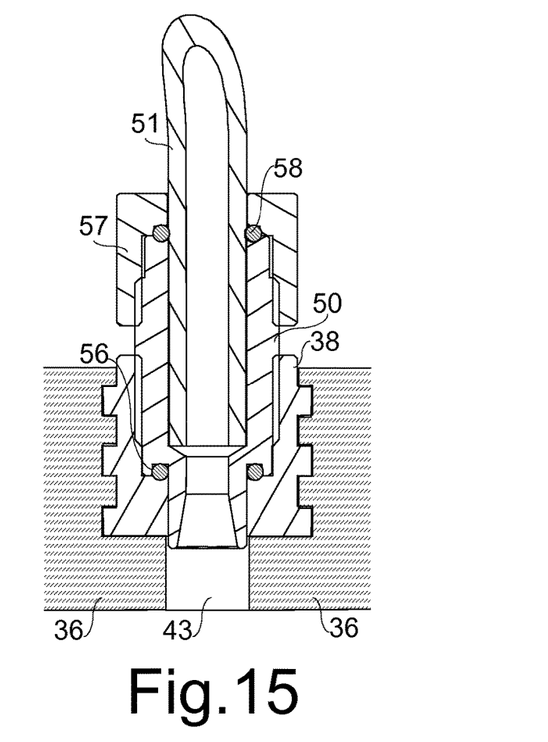
FIG. 15 shows an enlarged longitudinal section of an injector.

Referring to FIG. 15, it is seen that during the preparation of second mold 36, an outwardly threaded injector 50 is screwed into a third bushing 38 already incorporated in second mold 36, so as to urge a first annular gasket 56 arranged between injector 50 and third bushing 38. Inlet 51 is then inserted into injector 50 and locked by means of a ring 57 which is screwed onto injector 50, so as to urge a second annular gasket 58 against inlet 51. Suction mouth 52 and outlet 53 have the same structure and the same working of injector 50 and of inlet 51.

Figure 16:
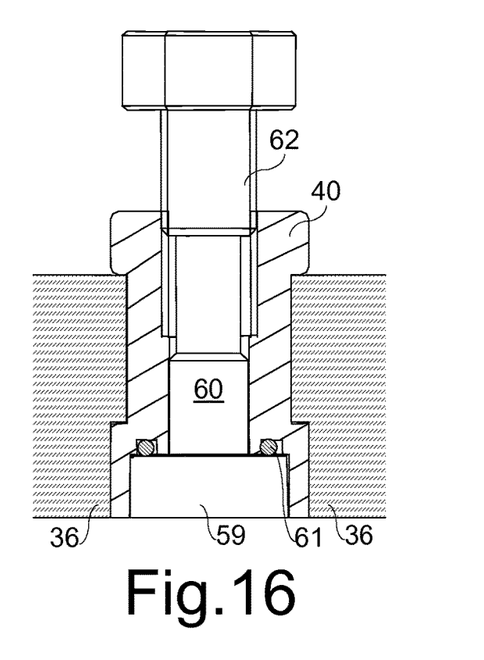
FIG. 16 shows an enlarged longitudinal section of an extractor.

Referring to FIG. 16, it is seen that during the preparation of second mold 36, a piston 59 provided with a stem 60 is inserted into a fifth bushing 40 already arranged in second mold 36, so as to urge a third annular gasket 61 housed in a cylindrical seat made in fifth bushing 40 for the head of piston 59. Stem 60 of the piston is connected to a threaded ring 62 which is screwed into fifth bushing 40, so that by rotating threaded ring 62 the head of piston 59 moves axially for projecting from second mold 36.

Figure 17:
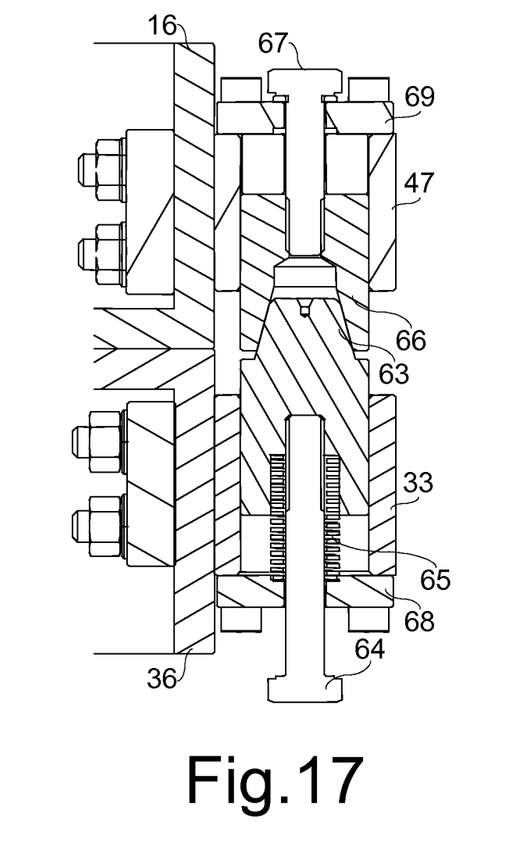
FIG. 17 shows an enlarged longitudinal section of a pair of centering devices.

Referring to FIG. 17, it is seen that first centering device 33 comprises a first conical or frustoconical head 63 which can be adjusted axially by means of a screw 64. A spring 65 allows an axial compression of first head 63 with respect to screw 64 for absorbing possible impacts during the coupling of molds 16, 36. Second centering device 47 comprises a second head 66 with a conical or frustoconical seat substantially complementary to first head 63. Also second head 66 can be adjusted axially by means of a screw 67. First head 63 and second head 66 can further be moved transversely by moving a first plate 68 of first centering device 33 and/or a second plate 69 of second centering device 47, so as to obtain, together with the axial adjustment, a perfect coupling of molds 16, 36 in the three dimensions. Plates 68, 69 are provided with a hole for containing screws 64, 67 in an axially sliding manner.

In alternative embodiments, the functional portion of the first mold or of the second mold, namely the portion of the mold which comprises the surfaces turned toward substrates 49 and which contacts at least one portion of final product 1 at the end of the process, may not comprise a cavity, but can be flat or even comprising a protuberance complementary to the cavity of the other mold. In these cases, the templates of the masters can be flat and/or have cavities. In other embodiments, the second mold may be provided with the first canals and/or with the second canal, while the first mold may be provided with the extractors, the injectors and/or the suction mouth. Molding units according to further embodiments may comprise more than two complementary molds mutually joined by means of mechanic fastening devices.

Figure 18:
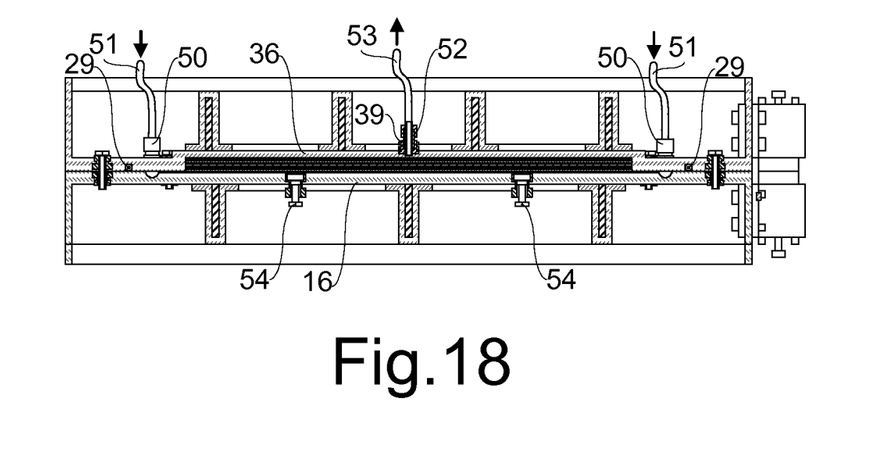
FIG. 18 shows a vertical section of a second embodiment of the molding unit.

Referring to FIG. 18, it is seen that for example in a second embodiment of the present invention first mold 16 is provided with extractors 54 and is substantially flat, namely lacking a cavity for substrates 49, while second mold 36 is provided with the cavity for substrates 49 and with canal 26 for gasket 29.

Further modifications and/or additions may be made by those skilled in the art to the hereinabove disclosed and illustrated embodiments while remaining within the scope of the following claims.

The invention claimed is:

1. A molding unit for manufacturing products made of composite materials, which molding unit comprises:
    at least two complementary molds, each mold comprising at least one functional portion made of a single piece of a composite material with at least one interface made of a composite material which projects at least partially around the functional portion,
    wherein each mold also comprises a plurality of bushings incorporated in the mold for coupling with the other mold by means of screws inserted into and fastened to the bushings,
    wherein a subset of the plurality of said bushings is provided with an inner thread,
    wherein each mold further comprises a backing plate spaced from an inner side of the single piece of composite material thereby defining an interior cavity of each mold, the inner side being opposite from the at least one functional portion of the mold,
    wherein each mold further comprises a set of stiffening ribs made from composite material permanently joined to the mold, the stiffening ribs extending across the inner cavity from the single piece of composite material to the backing plate, and
    wherein each mold is configured to provide a hermetic, evacuated environment after coupling of the molds
    wherein the stiffening ribs are permanently joined to the mold with an adhesive, pre-preg layers or a combination thereof.

2. The molding unit according to claim 1, wherein a distance between two adjacent bushings of a mold is between 35 and 100 mm.

3. The molding unit according to claim 1, further comprising at least one injector for injecting resin or at least one suction mouth, which are screwed in one or more additional threaded bushings incorporated in the mold.

4. The molding unit according to claim 3, further comprising an inlet or an outlet inserted in the injector or in the suction mouth, respectively, and locked by means of a ring screwed onto the injector or onto the suction mouth, so as to urge an annular gasket against the inlet or the outlet.

5. The molding unit according to claim 1, further comprising one or more extractors for extracting a final product from the functional portion, which are screwed into one or more of additional threaded bushings incorporated in the mold.

6. The molding unit according to claim 5, wherein the extractors comprise a piston connected to a threaded ring which is screwed into the bushing, so that by rotating the threaded ring the head of the piston moves axially for projecting from the mold.

7. The molding unit according to claim 1, wherein said molds are tightened to each other by means of screws, each inserted into two bushings incorporated in either mold, wherein one of said two bushings is threaded.

8. The molding unit according to claim 1, further comprising a gasket configured for placement between the molds.

9. The molding unit according to claim 8, wherein the gasket has a rigidity up to 60 Shore D.

10. The molding unit according to claim 1, wherein the stiffening ribs are permanently joined to the mold with a combination of an adhesive and pre-preg layers.

* * * * *